(12) United States Patent
Bronner et al.

(10) Patent No.: US 10,005,579 B2
(45) Date of Patent: Jun. 26, 2018

(54) SYSTEM AND METHOD FOR ASEPTIC AND STERILE PACKAGING OF LOW ACID LIQUIDS

(71) Applicants: Laurent Robert Bronner, Ingwiller (FR); Antje Spors, Rottweil (DE); Franz Liebermann, Feldmeilen (CH); Cornelis Johannes Maria Van Rijn, Hengelo (NL)

(72) Inventors: Laurent Robert Bronner, Ingwiller (FR); Antje Spors, Rottweil (DE); Franz Liebermann, Feldmeilen (CH); Cornelis Johannes Maria Van Rijn, Hengelo (NL)

(*) Notice: Subject to any disclaimer, the term of this patent is extended or adjusted under 35 U.S.C. 154(b) by 3 days.

(21) Appl. No.: 14/810,025

(22) Filed: Jul. 27, 2015

(65) Prior Publication Data

US 2016/0185474 A1     Jun. 30, 2016

Related U.S. Application Data

(60) Provisional application No. 62/096,629, filed on Dec. 24, 2014, provisional application No. 62/194,512, filed on Jul. 20, 2015.

(51) Int. Cl.
*B65B 55/02*     (2006.01)
*A23L 2/02*      (2006.01)
(Continued)

(52) U.S. Cl.
CPC ............... *B65B 55/02* (2013.01); *A01J 11/06* (2013.01); *A23C 3/005* (2013.01); *A23C 7/02* (2013.01);
(Continued)

(58) Field of Classification Search
CPC ......... B65B 55/02; B65B 55/12; B01D 63/16; A01J 11/06; A23C 3/005; A23C 7/02;
(Continued)

(56) References Cited

U.S. PATENT DOCUMENTS 5,356,651 A    10/1994  Degen et al.
6,120,730 A     9/2000  Palaniappan et al.
(Continued)

FOREIGN PATENT DOCUMENTS

CN         1679402 A      10/2005
CN       103202505 B      10/2014
(Continued)

OTHER PUBLICATIONS

International Search Report dated Mar. 10, 2016 issued in corresponding PCT/IB2015/059896 application (pp. 1-5).
(Continued)

*Primary Examiner* — Nicolas A Arnett
(74) *Attorney, Agent, or Firm* — Millen White Zelano and Branigan, PC

(57) ABSTRACT

A system for packaging a low acid liquid is provided herein. The system includes feeding unit configured to feed the low acid liquid into a filtration unit. The filtration unit is configured to filter the low acid liquid by using a number of pores provided on a micro sieve membrane. Further, the filtered low acid liquid is provided to an aseptic buffer unit configured to fill the aseptic filtered low acid liquid into packaging containers. The system further includes an automatic cleaning in place unit configured to automatically clean the feeding unit, the filtration unit and the aseptic buffer unit by decontamination using a decontaminating material.

16 Claims, 3 Drawing Sheets

(51) Int. Cl.
*B01D 63/16* (2006.01)
*A23L 2/42* (2006.01)
*A23L 2/74* (2006.01)
*A23C 3/00* (2006.01)
*A23C 7/02* (2006.01)
*A01J 11/06* (2006.01)
*B65B 25/00* (2006.01)
*B65B 3/00* (2006.01)

(52) U.S. Cl.
CPC .............. *A23L 2/02* (2013.01); *A23L 2/42* (2013.01); *A23L 2/74* (2013.01); *B01D 63/16* (2013.01); *B65B 25/001* (2013.01); *A23C 2210/208* (2013.01); *B65B 3/00* (2013.01); *B65B 2210/08* (2013.01); *B65B 2210/10* (2013.01)

(58) Field of Classification Search
CPC ....... A23C 2210/208; A23L 2/42; A23L 2/74; A23L 2/02
USPC ................................. 141/85, 89–91
See application file for complete search history.

(56) References Cited

U.S. PATENT DOCUMENTS

| 7,341,079 | B2* | 3/2008 | Zanga | B67C 3/22 141/145 |
| 8,529,670 | B2* | 9/2013 | Sangi | A61L 2/022 422/120 |
| 8,883,848 | B2* | 11/2014 | Bolduc | A01N 37/16 514/557 |
| 9,050,381 | B2* | 6/2015 | Iwashita | A61L 9/14 |
| 2009/0151814 | A1* | 6/2009 | Kelly | B05B 1/3046 141/286 |
| 2010/0032055 | A1* | 2/2010 | Sangi | A61L 2/022 141/168 |
| 2010/0037984 | A1* | 2/2010 | Hiroya | B67C 7/0073 141/59 |
| 2012/0080375 | A1 | 4/2012 | Scheu et al. | |
| 2012/0251665 | A1 | 10/2012 | Larsen et al. | |
| 2014/0352728 | A1* | 12/2014 | Svensson | A23C 7/02 134/18 |
| 2014/0377418 | A1* | 12/2014 | Eckman | B65B 55/12 426/232 |
| 2015/0313272 | A1* | 11/2015 | Han | A23L 2/42 426/392 |
| 2016/0045871 | A1 | 2/2016 | Liebermann et al. | |

FOREIGN PATENT DOCUMENTS

GB 2273885 A 7/1994
WO 2014/154761 A1 10/2014

OTHER PUBLICATIONS

Written Opinion dated Mar. 10, 2016 issued in corresponding PCT/IB2015/059896 application (pp. 1-9).
English Abstract of CN 1679402 A published Oct. 12, 2005.
English Abstract of CN 103202505 A published Jul. 17, 2013.

* cited by examiner

SYSTEM AND METHOD FOR ASEPTIC AND STERILE PACKAGING OF LOW ACID LIQUIDS

FIELD OF THE INVENTION

Embodiments of the present invention, generally relate to a system and method for packaging low acid liquids, and in particular relate to a system and method for aseptic and sterile packaging of low acid juices, without altering their flavor profile, nutrient content along with their chemical and physical properties.

BACKGROUND

Packaging of fruit juices has been an ever-evolving field of research. From manufacturing to consumption of such packaged juices, the time period may typically extend to several weeks and months. Therefore, it becomes very important for manufacturers of such packaged juices, to retain the freshness, flavor, chemical and physical properties of such juices while packaging them and still increase the shelf lives of such packaged juices. The consumer on the other hand in his or her good right is naturally expecting the flavor profile to be as close as possible to the original, raw product and is often disappointed when it doesn't, which detrimentally affects sales and the popularity of such packaged juices.

Low acidic juices and/or liquids, such as coconut water, coconut milk, coconut oil, milk, apple juice, strawberry juice, pear juice etc., find more complexity when it comes to packaging them. Generally, such low acid liquids and/or juices while being packaged undergo numerous industrial processes, such as extraction, pasteurization, filtration, degazing, enzyme neutralization, additives, radiation etc., which eventually damage and/or alter the original organoleptic properties of such fluids.

One known way of packaging such low acid juices include treatment of such juices to increase their shelf lives. Examples of such treatments known, include heat treatment, Ultra High Temperature (UHT) treatment, pasteurization treatments, chemical and/or radiation treatment. However, each of these treatments exposes the liquids and/or juices to modifications of the original chemical and physical properties which may be unhealthy for consumption. For example, exposure of juices to UHT may modify the chemical profile of juices by creating caramelization of sugars. These treatments also modify the flavor profile of such juices, thereby making them less appealable or rather unappealing to the consumers.

Similarly, under radiation such as Ultra Violet treatment, the UV rays cannot achieve complete sterility if applied moderately and if applied intensively damages the flavor profile and/or molecular connections of the juice.

Further, with chemical treatment, such as acidification, the chemical profile, such as PH profile of the juice may be altered. Addition of additives to increase the shelf lives of such packaged low acid juices again detrimentally alter the chemical profiles and flavor profiles of the original raw juices.

The low acid juices may also be filtered using many conventionally known techniques, such as traditional micro filtration including ceramic filtration, absolute cartridge filter or crossflow filter. However, either these filtration systems do not ensure aseptic filtering of such juices, or if they do, these filtration systems detrimentally affect the flavor profile of the juices by removing aromatic compounds, phyto-elements, minerals and nutrients, making them less appealing to the consumers than their original raw counterparts. Current commercially available micro-filtration systems that do not alter the organoleptic properties of juices are designed for laboratory or pharmaceutical use and therefore cannot keep up with the flux requirement needed in the industrial juice industry. These micro-filters clog rapidly after a short period of operation.

High Pressure Processing (HPP) has become increasingly used to treat fresh juices in the past years. The HPP technique however cannot eliminate the bacterial spores, which can lead to eventual development of pathogens when the packaged juice is exposed to temperature. The same applies for Pulsed Electric Field treatment.

A micro sieve filtration technique may be used for filtering such juices without altering the flavor profile and the nutrient content of the juices. However, while filtering, the s and/or the pores on such micro sieve membranes may get clogged by a layer of impurities, also called cake layer, which may result in degradation of the filtration capabilities of such filters.

Known methods of cleaning such clogged pores include back pulsing technology.

The back pulsing technology exposes the pores on the micro sieve membrane to pressure strokes from the filtrate side. Although the pressure strokes temporarily clear the spores, but it doesn't ensure complete removal of the cake layer from the membrane. Therefore, the pores get clogged again. High frequency back pulsing is therefore used to constantly push the cake layer up on the pores. As the cake layer becomes thicker and thicker during operation the flux drastically drops. Because of that and because the micro sieve is not cleaned over its entire surface during normal operation regular dismantling of filtration unit is necessary for some additional manual cleaning with chemicals directly applied on the micro sieve. The process is time consuming, even dangerous depending on the chemicals used and due to the fragility of the micro sieves themselves unpractical to perform in real life industrial settings. Additionally, the pressure strokes also tend to create vibrations that have been seen damaging or even shattering the very thin and delicate micro sieve membrane.

Therefore, there is a need for an improved system and a method for packaging low acid liquids under aseptic and sterile conditions.

SUMMARY

According to an aspect of the present disclosure, a system for packaging a low acid liquid is provided herein. The system includes an extraction unit configured to extract the juices from a raw material, a feeding unit configured to feed the low acid liquid into a filtration unit. The filtration unit is configured to filter the low acid liquid by using a number of pores provided on a single-layered micro sieve membrane configured to filter out all microorganisms while retaining all nutrients, organoleptic, chemical and physical properties of the original, raw juice. Further, the filtered low acid liquid is provided to an aseptic buffer unit configured to fill the aseptic filtered low acid liquid into packaging containers. The system further includes an automatic cleaning in place unit configured to automatically sterilize the feeding unit, the filtration unit and the aseptic buffer unit by rinsing using hot clean water, hot sterile air and decontamination using a decontaminating material.

According to another aspect of the present disclosure, a method for packaging low acid liquid is provided. The method includes feeding the low acid liquid into a filtration unit for filtration using a number of pores provided on a single-layered micro sieve membrane. Further, the method includes receiving the filtered low acid liquid into an aseptic buffer unit. The filtered low acid liquid is filled into the packaging containers through aseptic filling lines. The method further includes automatic sterilization of the feeding unit, the filtration unit and the aseptic buffer unit by rinsing using hot clean water, hot sterile air and decontamination using a decontaminating material.

The preceding is a simplified summary to provide an understanding of some aspects of embodiments of the present invention. This summary is neither an extensive nor exhaustive overview of the present invention and its various embodiments. The summary presents selected concepts of the embodiments of the present invention in a simplified form as an introduction to the more detailed description presented below. As will be appreciated, other embodiments of the present invention are possible utilizing, alone or in combination, one or more of the features set forth above or described in detail below.

BRIEF DESCRIPTION OF THE DRAWINGS

The above and still further features and advantages of embodiments of the present invention will become apparent upon consideration of the following detailed description of embodiments thereof, especially when taken in conjunction with the accompanying drawings, and wherein.

To facilitate understanding, like reference numerals have been used, where possible, to designate like elements common to the figures.

DETAILED DESCRIPTION

As used throughout this application, the word may is used in a permissive sense (i.e., meaning having the potential to), rather than the mandatory sense (i.e., meaning must). Similarly, the words "include", "including", and "includes" mean including but not limited to.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Figure 1:
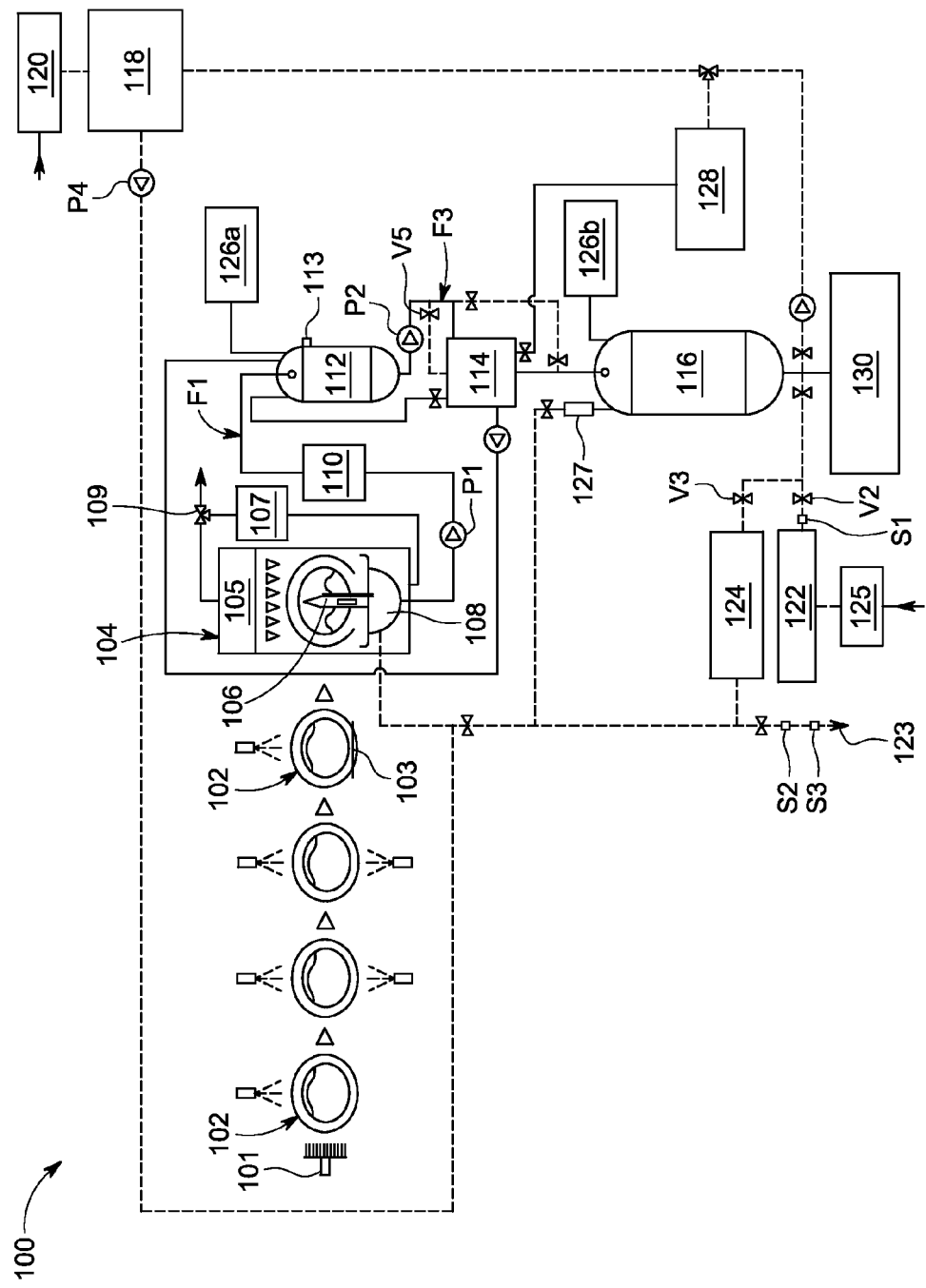
FIG. 1 illustrates a schematic diagram of a system for packaging low acid liquids, according to an embodiment of the present invention.

FIG. 1 illustrates a schematic representation of a system 100 for packaging low acid juices. In an embodiment of the present disclosure, the system 100 is described for aseptic and sterile packaging of fresh coconut water without altering or hampering flavour profile, nutrient content, chemical or physical profile and organoleptic properties, in order to achieve extended shelf life of such packaged coconut water. In various other embodiments, the system 100 may be used for aseptic and sterile packaging of any other low acid juice or liquid, such as pear juice, apple juice, milk, etc.

As shown in FIG. 1, the system 100 includes an extraction unit 104, a feeding unit 112, a filtration unit 114 and an aseptic buffer unit 116. In an embodiment of the present disclosure, the system 100 includes an automatic cleaning in place (CIP) unit 118 operating jointly with a hot air blower 122 and a VHP decontamination unit 124 and configured to automatically clean the feeding unit 112, sterilize the filtration unit 114 and the aseptic buffer unit 116 of the system 100 in between times of normal operation cycle. A HEPA vent 127 is provided to allow hydrogen vapours to be safely released after decontamination cycle. The HEPA vent 127 can be placed as well at the exhaust location to prevent microbiological backflow into the system (not shown on drawings). For indicative purposes, it may be understood that the solid lines between the various components of the system 100 indicate the operational and fluidic connection between such components. Whereas, the dotted lines indicate the CIP operational connection between the various components of the automatic CIP unit 118 and the system 100.

According to an embodiment of the present disclosure, the fresh coconut 102 is initially cleaned and sanitized before feeding it into the extraction unit 104 for extracting the coconut water. For example, the system 100 may optionally include a cleaning unit (not shown) configured to clean and sanitize the coconut 102 before feeding it to the extraction unit 104.

As shown in FIG. 1, initially a brush 101 is configured to clean the coconut 102 to remove dirt and soil from the outer surface of the coconut 102. It may be contemplated that the sanitization may be done using any conventional methods known in the art, namely, heat based and chemical based. For chemical based sanitization, the system 100 is configured to use chemical sanitizers approved by Food and Drug Administration (FDA). Examples of FDA approved sanitizers may include, but not limited to, peracitic acid, hydrogen peroxide, chlorine, iodine, bromine based sanitizers, phenol based sanitizers, etc.

Furthermore, once the brushing and sanitizing of the coconut 102 is done, a spray of clean, optionally hot, water rinses the coconut 102, to wash off the dirt, soil and the sanitizer from the outer surface of the coconut 102. The cleaning and sanitizing of the coconut 102 is done to prevent any dust, soil from entering the system 100 and/or reduce the bioburden in the extracted coconut water so as to extent the periods of operation of the system 100 and minimize loss of retentate. According to an embodiment of the present disclosure, the cleaning unit is provided inline within the system 100 as a distinct unit so as to provide automatic cleaning and sanitizing of the coconuts 102 within the system 100. However, in alternative embodiments, the cleaning unit may be placed offline as a separate unit from the system 100 to provide offline cleaning and sanitizing of the coconuts 102 before feeding them to the system 100.

The extraction unit 104 is configured to extract coconut water from the fresh and cleaned coconut 102. However, as shown in the figure, a localized portion 103 of the coconut 102 is cut before feeding the coconut 102 into the extraction unit 104, either manually or by using automated cutting tools, so as to prevent any tannins present in the outer surface, such as the green skin of the coconut 102 from entering the extraction unit 104 along with the coconut water and detrimentally affect the flavour.

In an embodiment of the present disclosure, the extraction unit 104 includes a needle 106 associated with a container 108. The needle 106 punctures the coconut 102 from the pre-cut localized portion 103 to extract the coconut water into the container 108. The needle 106 and the container 108 extract the coconut water under laminar flow in order to reduce microbiological contamination during and after the extraction of the coconut water from the coconut 102 into the container 108.

According to the present embodiment, the extraction unit 104 is kept clean by using an air filter such as a High-Efficiency Particulate Arrestance (HEPA) filter 105. It may be contemplated that the air within the extraction unit 104 is cleaned so as to reduce the microbiological contamination of the extracted coconut water flowing into the container 108 and therefore extend the normal periods of operation of the system 100 and minimize the loss of retentate. The HEPA filter 105 is a conventionally known air filter configured to clean the air present within the extraction unit 104. Therefore, the detailed explanation of the HEPA filters is not provided herein for the sake of brevity.

The container 108 of the extraction unit 104 is fluidly connected by fluid connection F1 to the feeding unit 112 via a pre-filter 110 and a pump P1, as shown in FIG. 1. According to an embodiment of the present disclosure, the pre-filter 110 is a 10 to 20 microns pre-filter configured to remove large particles present in the extracted coconut water prior to entering the feeding unit 112.

Further, the feeding unit 112 receives the pre filtered coconut water from the pre-filter 110. In an embodiment of the present disclosure, the feeding unit 112 is a small buffer tank. It may be contemplated that cooling down of the coconut water in the feeding unit is optional and may be omitted without deviating from the scope of the claimed subject matter. Furthermore, the feeding unit 112 includes a sensor 113 configured to sense when the feeding unit 112 is full with the coconut water in order to synchronize the extraction of coconut water. Therefore, when the sensor 113 indicates that the feeding unit 112 is full, the extraction may stop or slow down and similarly, resume when the sensor 113 indicates that the feeding unit 112 is ready to receive more of extracted coconut water from the extraction unit 104.

The feeding unit 112 includes a nitrogen blanket configured to prevent oxidation and ultimately pinkening of the extracted coconut water within the feeding unit 112. Unlike air, liquid nitrogen is chemically inert, therefore, it does not chemically react with or alter the chemical profile of the coconut water stored within the feeding unit 112. For example, as shown in FIG. 1, the feeding unit 112 is fluidly connected to a first liquid nitrogen injector 126a in order to receive and maintain the nitrogen blanket.

Figure 2:
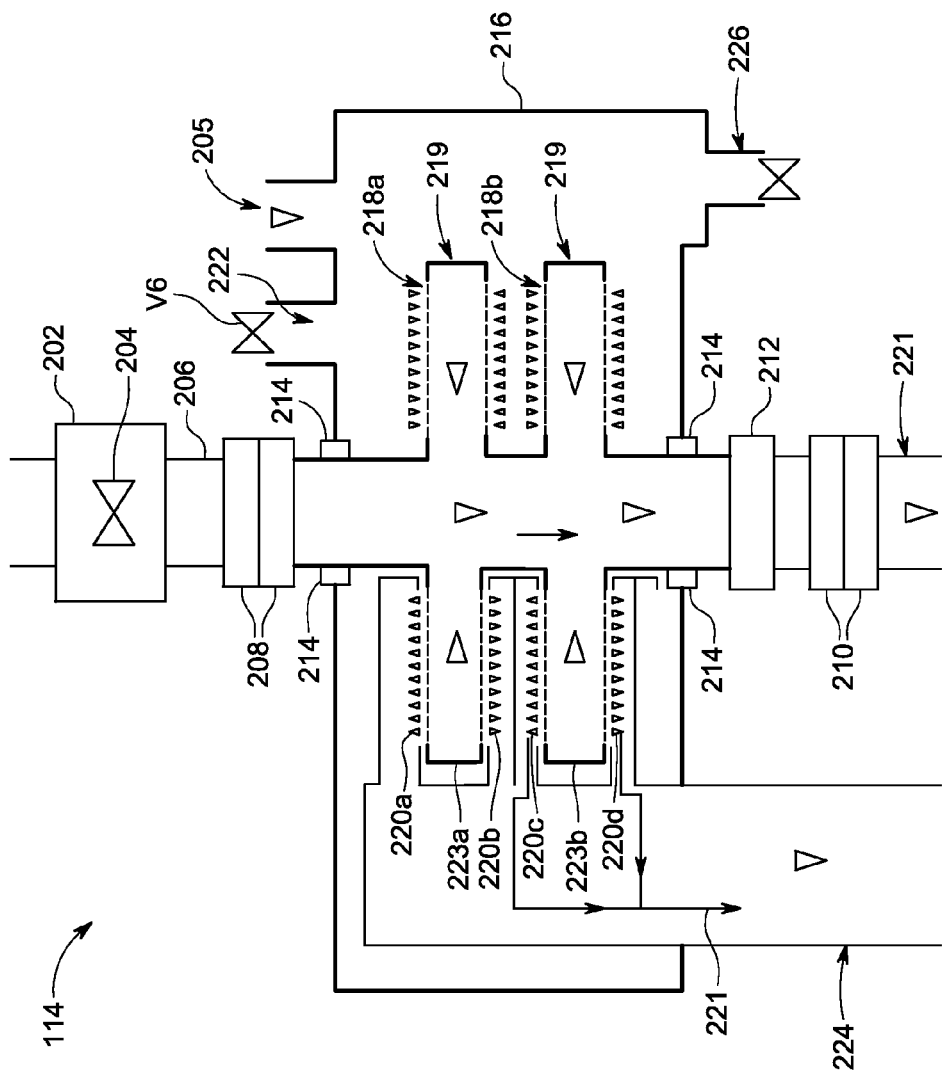
FIG. 2 illustrates a schematic diagram of a filtration unit used in the system for packaging low acid liquids, according to an embodiment of the present invention.

Further, the feeding unit 112 is fluidly connected through a fluidic connection F3 to the filtration unit 114 via a pump P2. In an embodiment of the present disclosure, the filtration unit 114 is a dynamic micro sieve filtration system. For example, the filtration unit 114 includes a micro sieve membrane 218a and 218b (shown in FIG. 2 and collectively referred to as the micro sieve membrane 218. The micro sieve membrane 218 is a very thin plate which includes a number of pores configured to filter coconut water from smallest microorganisms present in coconut water and therefore render it sterile. For example, the pores have a size less than 0.45 microns and may be even smaller depending on the low acid juice or liquid being filtered. The micro sieve membrane 218 (as shown in FIG. 2) rotates while filtering the continuously fed coconut water through the pores.

According to an embodiment of the present disclosure, the micro sieve membrane 218 is a thin silicon nitride plate having pores. Other materials may be used such metal alloys, amorphous metal, metaloid alloys, glass/glass derivates, carbon based material and structures or graphene using the same sieve principle. Micro sieves can generally be considered as a special type of high flux membranes: these are defined as membranes with a thin separating layer determining the particle cut-off size and a support which should not contribute significantly to the flow resistance of the full membrane. Typically the separating layer should not be thicker than one to twenty times the mean pore size. Examples are track etched micro filtration membranes, ceramic filter discs in the ultra filtration or nanofiltration regime, and micro sieves in the microfiltration regime. A good example of micro sieves are microfabricated membranes with a very thin selective silicon nitride layer, featuring a very high clear water flux, with homogeneous features, such as pore size and shape. The clear water flux of silicon nitride based micro sieves with a membrane layer having a thickness less than 3 times the pore diameter is typically 50-500 times higher in comparison with the clear water flux of ceramic discs (e.g. silicon carbide) used in rotation microfiltration technology, Characteristics such as a very thin selective layer, well-structured pore size and shape, and smooth surfaces would be ideal for surface chemistry enabling a low-fouling high flux membrane filtration. High flux membranes can also be defined from their intended use for rapid flow reversal to remove the cake layer on and the fouling layer in the membrane in the order of 5 millisecond or less. For an achieved operating process flux $\Phi$ of 5.000 liter/$m^2$/hour the effective membrane layer (excluding the support layer) should typically be smaller than 5 micrometer to have sufficient flow reversal to empty the fouling layer content inside the membrane layer over a full thickness of 5 micrometer. High flux membranes therefore opens up not only applications in the microfiltration regime (100 nm-10 μm), but also in the ultra (10-100 nm) and nano (140 nm) filtration regime, provided that a sufficient thin separating membrane layer can be mounted on supports having a low contribution to the total flow resistance. In an alternative embodiment, the membrane 218 may be replaced by a silicon carbide disc or an aluminium oxide disc, or any disc formed of other materials such as metal alloys, amorphous metal, metaloid alloys, glass/glass derivates, carbon based material and structures or graphene in combination with the same operating principle of the present disclosure. It may be contemplated that the materials of the micro sieve membrane 218 are merely exemplary and may be varied to achieve similar results without deviating from the scope of the claimed subject matter.

Once filtered through the micro sieve membrane 218 of the filtration unit 114, the filtration unit 114 passes the filtrate to the aseptic buffer unit 116 through the fluidic connection F3. As shown in the figure, the aseptic buffer unit 116 continuously receives the filtrate from the filtration unit 114. The aseptic buffer unit 116 is configured to store the filtrate, i.e., the filtered coconut water, under aseptic conditions. For example, the aseptic buffer unit 116 includes a nitrogen blanket for preventing any oxidation and pinkening of the aseptic coconut water in the aseptic buffer unit 116. As shown in FIG. 1, the aseptic buffer unit 114 is also fluidly connected to a second liquid nitrogen injector 126b for maintaining the nitrogen blanket therein. It may be contemplated that although there are two separate nitrogen injectors shown to be connected each to the feeding unit 112 and the aseptic buffer unit 116, a single nitrogen injector may also be used without deviating from the scope of the claimed subject matter.

Subsequently, the aseptic buffer unit 114 is configured to progress the filtrate coconut water into commercial packaging containers (not shown) through an aseptic filling line 130. For example, the system 100 includes a number of nozzles (not shown) configured to fill the coconut water into the commercial containers. According to an embodiment of the present disclosure, the commercial containers may be opaque to protect the coconut water against harmful Ultra Violet (UV) rays so as to further extend shelf life and preserve the original organoleptic of the coconut water so packaged.

In an embodiment, the system 100 includes the automatic CIP unit 118 configured to automatically clean the various components of the system 100. For example, the CIP unit 118 is configured to clean the extraction unit 104, the feeding unit 112, the filtration unit 114 and the aseptic buffer unit 116. As explained previously, the dotted lines indicate the cleaning line connections between the various components of the system 100.

The components of the system 100 may be cleaned and sterilized quickly after every filling cycle, hereinafter referred to as the sterilization cycle. Additionally, the entire system 100 may be cleaned for maintenance purposes periodically, such as every month or two, hereinafter referred to as the maintenance cycle of the system 100.

In an embodiment of the present disclosure, for the sterilization cycle performed after every extraction, filtration and filling cycle within the system 100, the CIP unit 118 is configured to initially rinse and flush each of the extraction unit 104, the feeding unit 112, the filtration unit 114 and the aseptic buffer unit 116 with clean hot water. According to an embodiment of the present disclosure, the CIP unit 118 includes a hot water dispensing unit (not shown) configured to selectively dispense the hot clean water to each of the extraction unit 104, the feeding unit 112, the filtration unit 114 and the buffer unit 116. For example, the hot water dispensing unit is configured to use water heated up to a temperature within a range of about 80° C. to 100° C., and preferably up to 90° C. to initially rinse the components of the system 100. It may be contemplated that the hot water dispensing unit may dispense hot clean water via one or more valves that open and shut to selectively provide hot water rinsing to the various components of the system 100. In an embodiment of the present disclosure, the flow of hot water may start from the extraction unit 104 and proceed to the feeding unit 112, the filtration unit 114 and then finally the aseptic buffer unit 116 respectively.

According to an embodiment of the present disclosure, the hot water dispensing unit of the CIP unit 118 further includes a Reverse Osmosis (RO) unit 120 configured to purify the water supplied to the various components of the system 100 for cleaning. The RO unit 120 is a conventionally known water purifier, therefore, the detailed working of the RO unit 120 is not provided herein for the sake of brevity.

The purification of water through the RO unit 120 is done to prevent any contamination of the coconut water while extracting, feeding, filtering and filling it into the commercial containers for packaging. It may be contemplated that the water is purified prior to entering the components of the system 100, to remove hardness and microbiological organisms present in the water which may damage the coconut water therein and the micro sieve membrane 218 of the filtration unit 114 through a process known as scaling or hard deposits of minerals for example. It may be understood that the hard and impure water may clog the pores of the micro sieve membrane 218, therefore, it is necessary to remove the hardness and the impurities present in the water through the RO unit 120 before feeding the water into the filtration unit 114. As shown in FIG. 1, it may be contemplated that the hot and clean water is provided to the various components of the system via a pump P4 and one or more valves (not shown).

Subsequently, the CIP unit 118 is configured to remove the water content from each of the extraction unit 104, the feeding unit 112, the filtration unit 114 and the buffer unit 116. In an embodiment of the present disclosure, the CIP unit 118 includes a drying unit 122 configured to blow air via a valve V2, into the various components of the system 100 to remove and dry out any water content present therein after the rinsing. According to an embodiment of the present disclosure, the drying unit 122 blows the hot air starting from the aseptic buffer unit 116, followed by the filtration unit 114, the feeding unit 112 and then finally the extraction unit 104. Further, the hot air may exit from the exhaust 109.

It may be contemplated that the hot air provided to each of the components of the system 100 is provided through a HEPA filter 121 so that no impurities enter within the components which could spoil and/or damage the components therein. In an exemplary embodiment, the air for drying the components of the system 100 may be heated up to a temperature within a range of about 110° C. to 125° C., and preferably up to 120° C. It may be understood that the air may be heated by a separate online heating unit (not shown) prior to entering the various components of the system 100. Further, the drying unit 122 includes a temperature sensor S1 configured to continuously monitor and maintain the temperature of the air during the drying cycle. The temperature sensor S2 located at the exhaust 123 ensures that all parts of the system 100 to be sterilized have reached the target temperature. The humidity sensor S3 measuring water vapours ensures that exhaust air reached target humidity level confirming that water has effectively been removed from system 100.

Once the water content from within each of the components of the system 100 is removed by the hot air, the air within the components is subsequently cooled down to a temperature within a range of about 50° C. to 65° C., and preferably to 60° C. The air is cooled down by switching off the heating unit (not shown) of the system 100.

Furthermore, according to an embodiment of the present disclosure, the CIP unit 118 includes a decontamination unit 124. The decontamination unit 124 is configured to decontaminate the various components of the system 100 by using a decontamination material. Similar to the hot air flow, the decontamination material is first provided to the aseptic buffer unit 116, followed by the filtration unit 114, the feeding unit 112 and finally the extraction unit 104. Furthermore, the decontamination material exits through the exhaust 109 provided with the extraction unit 104.

In an exemplary embodiment of the present disclosure, the decontamination material used by the decontamination unit 124 is Hydrogen Peroxide Vapours (hereinafter referred to as VHP). The decontamination unit 124 may include a temperature sensor S2 and a humidity sensor S3 configured to detect the temperature and humidity within the components of the system 100. It may be contemplated that prior to the decontamination of the components, the temperature sensor S2 and the humidity sensor S3 ensure that the components are completely dry and cooled down, so that the VHP vapours can effectively decontaminate the components of the system 100.

It may be contemplated that the CIP unit 118 continuously cleans the various components of the system 100 in a manner described above, after every extraction and filling cycle for packaging the coconut water. However, it may also be contemplated that the entire system 100 may be run through a maintenance cycle periodically, such as every month.

For the maintenance cycle cleaning of the components of the system 100, the CIP unit 118 is configured to initially rinse and flush the components using hot clean water, in a similar manner as explained above for the regular cleaning cycle. For example, the components are rinsed using clean water from the RO unit 120 heated up to a temperature of 90° C.

Further, the CIP unit 118 includes an alkaline dispensing unit (not shown) configured to selectively dispense alkaline solution into each of the extraction unit 104, the feeding unit 112, the filtration unit 114 and the buffer unit 116. Similar to the hot water flow, the alkaline solution is first provided to the extraction unit 104, then the feeding unit 112, followed by the filtration unit 114 and finally the aseptic storage unit 116. The alkaline solution removes any fats and/or oil, or bio films accumulated over a period of time into the various components of the system 100. According to an embodiment of the present disclosure, the alkaline solution is dispensed at a temperature of about 70° C. via a pump P4 and a valve V4. Subsequently, the CIP unit 118 rinses the components with clean water from the RO unit 120. The cold and clean water removes the traces of the alkaline solution from the components of the system 100.

Furthermore, the CIP unit 118 is configured to sanitize the components of the system 100. In an embodiment of the present disclosure, the CIP unit 118 includes an acid dispensing unit (not shown) configured to selectively dispense acid solutions to the components of the system 100 via one or more valves. Similar to the hot water and the alkaline solution flow, the acid solution is first provided to the extraction unit 104, then the feeding unit 112, followed by the filtration unit 114 and finally the aseptic storage unit 116. Acid is used to prevent scaling and hard mineral deposits in the system 100. It may be well appreciated that the alkaline solution and the acid solution used for cleaning and sanitizing the various components of the system 100 are FDA approved. According to an embodiment of the present disclosure, the acid solution is dispensed at a temperature of about 70° C.

Once the sanitizing of each of the extraction unit 104, the feeding unit 112, the filtration unit 114 and the buffer unit 116 is completed, the CIP unit 118 again rinses them with clean RO water from the RO unit 120 in order to remove all the traces of the acid solution from the components.

Furthermore, the CIP unit 118 dries and decontaminates the components of the system 100 by using hot air and VHP vapours respectively, in a similar manner as explained previously for the sterilization cycle of the CIP unit 118 and the system 100.

During hot water flushings, alkaline cycles and acid cycles, the pressure and flow on the microsieve membranes 218 is maintained to be low and steady, so as not to shatter and damage the membranes 218. However, instead of relying on high flow and high pressure for turbulences as is usually the case under normal industrial CIP conditions, the membranes 218 are rotated at high speeds and cleaned by shear forces and friction created by the rotary motion.

According to an embodiment of the present disclosure, the system 100 includes a waste water treatment unit 128 configured to treat and recycle all the waste water purged out of the system 100 during the sterilization and maintenance cycle of the CIP unit 118.

FIG. 2 illustrates a schematic representation of the filtration unit 114 of the system 100. The working of the filtration unit 114 and the cleaning of the filtration unit 114 is described herein as under in conjunction with FIG. 2.

In an embodiment of the present disclosure, the filtration unit 114 includes at least one, thin single-layered micro sieve membrane 218 having a number of pores. In the present embodiment, two membranes 218a, 218b are shown. The micro sieve membranes 218 are supported by support discs 219. The micro sieve membranes 218 rotate on a hollow rotary shaft 206 to which they are attached. Rotation is achieved in conjunction with a toothed belt wheel 212 and rotary unions 208, 210 positioned on the two longitudinal sides of the rotary shaft 206. The rotary shaft 206, is sealed to a housing 216 enclosing the micro sieve membrane 218 by using a number of seal bearings 214, as shown in FIG. 2.

According to an embodiment of the present disclosure, the filtration unit 114 receives the coconut water from the feeding unit 112 through a feed inlet 205. The coconut water is continuously fed to the filtration unit 114 such that the pores of the micro sieve membrane 218 are continuously immerged into coconut water under a low positive pressure from the feed side of the membrane 218 and thus filtered to provide the filtrate, i.e., the filtered coconut water into the aseptic buffer unit 116 through an outlet 221. Furthermore, air or air bubbles and the excess amount of unfiltered coconut water are fed back to the feeding unit 112 through the fluidic connection F5 (shown in FIG. 1) via an overflow vent 222. For example, a valve V6 may be positioned on the overflow vent 222 to open in case of an overflow and allow the air and the excess unfiltered coconut water to pass back to the feeding unit 112. Once all air bubbles have been removed, the valve V5, either remains close during normal operation or is partially opened to occasionally depressurize the feed side of the filtration unit 114 and create a backflow or reverse flow to further clean the membranes 218 through suction slits 220a, 220b.

The micro sieve membrane 218 is configured to rotate with the rotary shaft 206. The filtrate passes through the hollow passage within the rotary shaft 206 to the outlet 221. The rotary shaft 206 includes a CIP valve 204 configured to provide one way flow of the filtrate during the normal operation cycle by remaining close. Further, the CIP valve 204 remains open during the sterilization cycle, thereby making the rotary shaft 206 open on both sides. It may be contemplated that the rotary shaft 206 is connected by a toothed belt wheel 212 to a motor (not shown) that is positioned outside the filtration unit 114 for rotating the rotary shaft 206 and hence the micro sieve membranes 218.

The rotation speed of the rotary shaft 206 may be controlled by an inverter on the motor and can be adjusted for optimal flux.

According to an embodiment of the present disclosure, the filtration unit 114 includes a number of suction slits 220a, 220b, 220c, and 220d collectively referred to as the suction slits 220 supported on suction bars 223a and 223b respectively. The suction slits 220 and the suction bars 223 are connected to a suction pipe 224. The suction bars 223 are placed parallel to the micro sieve membrane 218, at a predetermined distance. The distance of the suction bars 223 and the suction slits 220 from the micro sieve membrane 218 may depend on a desired suction power required therein.

It may be well known that the pores on the micro sieve membrane 218 tend to get clogged by the impurities filtered out from the filtrate coconut water during the filtration cycle. Such clogging forms a layer of impurities (interchangeably referred to as the cake layer) on a feed side of the micro sieve membrane 218 (the side of unfiltered coconut water). The layer of impurities is continuously removed by the suction slits 220 leaving the filtration unit 114 through the suction pipe 224, as shown by the arrow 221.

In an embodiment of the present disclosure, the filtration unit 114 uses a high-Frequency flow reversal technique to clear the layer of impurities and clogging in the micro sieve membrane 218. In principle, the micro sieve membrane 218 rotates so that any point of the micro sieve membrane 218 passes multiple times per second in close proximity of the suction slits 220a, 220b, thereby creating a slight vacuum to reverse the flow at a very precisely localized spot of the membranes 218 in order to pull out the entire layer of impurities on the feed side through the suction pipe 224 via the suction slits 220 and a suction pump connected to suction pipe 224 heads 221. In order to continuously clean the filtrate unit 114, the vacuum is generated continuously. However, the suction or the vacuum generated on the feed side may be increased or decreased as desired by altering the distance between the suction bars 223 and the micro sieve membrane 218. For example, lesser the distance between the suction bars 223 and the micro sieve membrane 218, higher the suction power generated, and vice-versa. The vacuum suction and the movement of the cake layer by using the vacuum suction is merely exemplary. In an alternative embodiment of the present disclosure, the cake layer may be removed by using any other technique of creating vacuum, such as by simply rotating the suction bars 220 to cover every point of the membranes 218 for sucking out the cake layer. In a still another embodiment, the membranes 218 may be linearly moved back and forth with respect to the suctions bars 220 in order to suck the cake layer into and through the suction pipe 224.

In a continuous cycle of filtration, the impurities along with the coconut water in the suction pipe 224 are pushed back to the feeding unit 112 via a suction pump to be mixed with the extracted coconut water. It may be contemplated that other methods and techniques of generating vacuum and flow reversal may also be used to achieve similar results, without deviating from the scope of the claimed subject matter.

Figure 3:
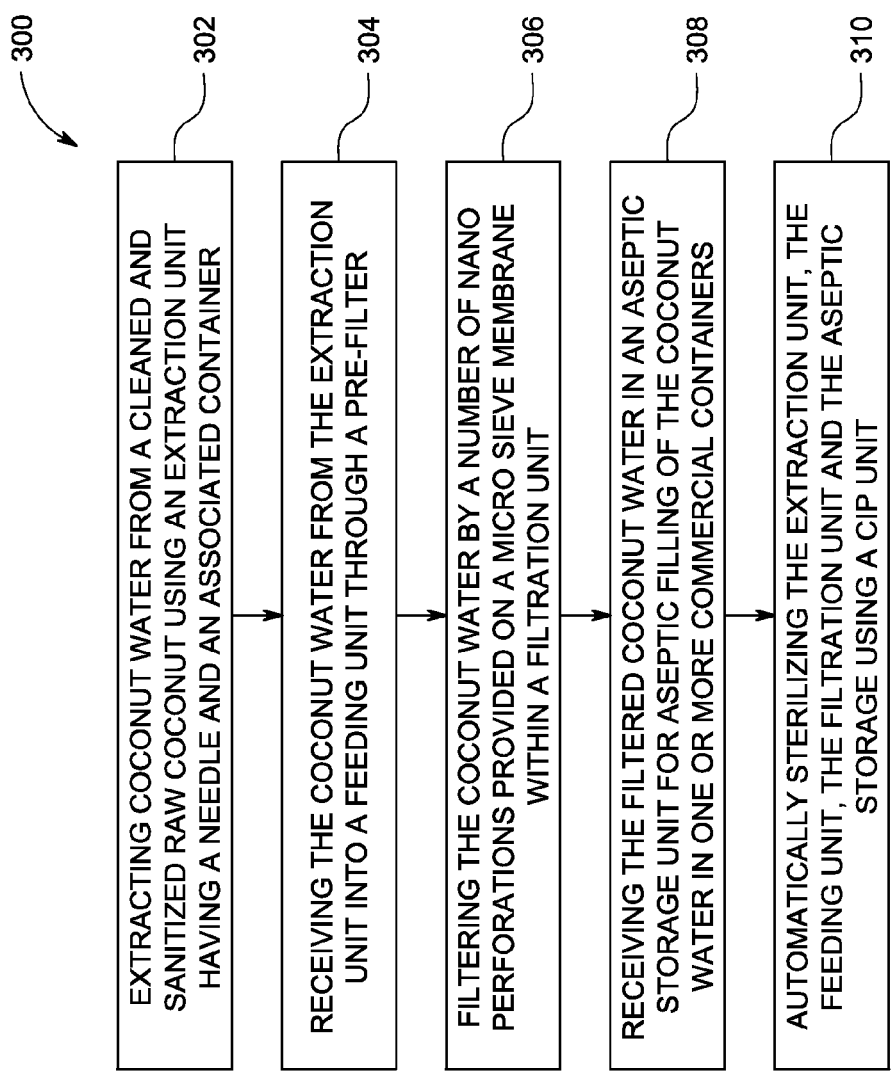
FIG. 3 depicts an exemplary flowchart illustrating a method for packaging low acid liquids, according to an embodiment of the present invention.

FIG. 3 illustrates an exemplary flowchart 300 for a method of packaging a low acid juice or liquid, such as coconut water, according to an embodiment of the present disclosure.

Initially, at step 302, the coconut water is extracted by an extracting unit 104. It may be contemplated that according to an embodiment of the present disclosure, the low acid juice is coconut water. However, according to various alternative embodiments, the method may also be used to package any other low acid juice such as milk, apple juice, pear juice, etc.

In case of coconut water, prior to extracting, the raw young coconut 102 is cleaned and sanitized to remove any dirt, or soil from the outer surface, such as the green portion of the coconut 102 and/or reduce the bio burden in the extracted coconut water so as to extend the periods of operation of the system 100 and minimize loss of retentate. In an exemplary embodiment, the outer surface of the coconut 102 may be brushed by a brush 101 and sanitized using an FDA approved sanitizer. Further, the coconut 102 may be rinsed with clean water to clean the sanitizer from the outer surface.

Further, for extracting, a localized portion 103 of the coconut 102 is cut in order to facilitate clean and aseptic extraction of the coconut water. The needle 106 is pierced into the coconut 102 through the cut portion of the coconut 102 to extract the coconut water into the container 108.

At step 304, the coconut water is received in a feeding unit 112 through a pre filter 110. For example, the pre-filter 110 removes large particles present in the extracted coconut water prior to entering the feeding unit 112.

In an embodiment of the present disclosure, a nitrogen blanket is provided within the feeding unit 112 to prevent oxidation and ultimately pinkening of the extracted coconut water therein.

Further, at step 306, the coconut water is filtered by using a filtration unit 114. For example, the filtration unit 114 is fluidly connected to receive the coconut water from the feeding unit 112. In an embodiment of the present disclosure, the coconut water is filtered using a one or more dynamic micro sieve filtration membranes 218 having a number of pores, the pores being smaller than smallest of bacteria for example. The pores allow the smallest particles of the liquid coconut water to pass through thereby retaining the impurities as well as smallest of microorganisms on the feed side of the micro sieve membrane 218, therefore rendering it sterile. For example, the pores have a size of less than 0.45 microns and may be even smaller depending on the low acid juice or liquid being filtered.

For filtration, the micro sieve membrane 218 is continuously rotated to generate a low positive pressure on the feed side. The coconut water is continuously fed to the filtration unit 114 such that the pores of the micro sieve membrane 218 are continuously immerged into coconut water under a low positive pressure from the feed side of the membrane 218 and thus filtered to provide the filtrate, i.e., the filtered coconut water into the aseptic buffer unit 116. In principle, the micro sieve membrane 218 is continuously rotated so that any point of the micro sieve membranes 218 passes multiple times per second in close proximity of the suction slits 220a, 220b, thereby creating a slight vacuum to reverse the flow at a very precisely localized spot of the membranes in order to pull out the entire layer of impurities on the feed side through the suction pipe 224 via the suction slits 220.

Furthermore, at step 308, the filtered coconut water is received into the aseptic buffer unit 116. For example, the filtered coconut water is further dispensed into the commercial containers from the buffer unit 116 via a number of aseptic filling lines 130 and nozzles (not shown). A nitrogen blanket is provided within the aseptic buffer unit 116 for preventing any oxidation and pinkening of the aseptic coconut water in the aseptic buffer unit 116.

Furthermore, at step 308, each of the extraction unit 104, the feeding unit 112, the filtration unit 114 and the buffer unit 116 is automatically cleaned and sterilized by the automatic cleaning in place unit 118 operating jointly with a hot air blower 122 and a VHP decontamination unit 124.

The components may be cleaned and sterilized in between the times of operating cycle such as quickly after every filling cycle, hereinafter referred to as the sterilization cycle. Additionally, the components may be cleaned for maintenance purposes periodically, such as every month or two, hereinafter referred to as the maintenance cycle.

In an embodiment of the present disclosure, for the sterilization cycle performed after every extraction, each of the extraction unit 104, the feeding unit 112, the filtration unit 114 and the aseptic buffer unit 116 are initially rinsed with clean hot water. According to an embodiment of the present disclosure, a hot water dispensing unit (not shown) dispenses the hot clean water to each of the extraction unit 104, the feeding unit 112, the filtration unit 114 and the buffer unit 116. For example, the water may be heated up to a temperature within a range of about 80° C. to 100° C., and preferably up to 90° C. to initially rinse the components.

According to an embodiment of the present disclosure, the hot water may be initially cleaned by using a Reverse Osmosis (RO) unit 120. It may be contemplated that the water is purified prior to entering the components of the system 100, to remove hardness and microbiological organisms present in the water which may damage the coconut water therein and the micro sieve membrane 218 of the filtration unit 114.

Subsequently, the water is removed from each of the extraction unit 104, the feeding unit 112, the filtration unit 114 and the buffer unit 116. In an embodiment of the present disclosure, hot air is blown into the components by a drying unit 122 to dry out any water content present therein after the rinsing step. It may be contemplated that the hot air provided to each of the components of the system 100 is provided through a HEPA filter 121 so that no impurities enter within the components which could spoil and/or damage the components therein. In an exemplary embodiment, the air for drying the components of the system 100 may be heated up to a temperature within a range of about 110° C. to 125° C., and preferably up to 120° C.

Once the water content from within each of the components of the system 100 is removed by the hot air, the air within the components is subsequently cooled down to a temperature within a range of about 50° C. to 65° C., and preferably to 60° C.

Furthermore, each of the extraction unit 104, the feeding unit 112, the filtration unit 114 and the aseptic buffer unit 116 is decontaminated by a decontamination unit 124 by using a decontamination material. For example, the decontamination material may be Hydrogen Peroxide Vapours (hereinafter referred to as VHP).

It may be contemplated that the CIP unit 118 continuously cleans the various components of the system 100 in a manner described above, after every extraction and filling cycle for packaging the coconut water. However, it may also be contemplated that the entire system 100 may be run through a maintenance cycle periodically, such as every month.

For the maintenance cycle cleaning of the components of the system 100, each of the extraction unit 104, the feeding unit 112, the filtration unit 114 and the aseptic buffer unit 116 is initially rinsed using hot clean water, in a similar manner as explained above for the regular cleaning cycle.

Subsequently, an alkaline solution is selectively dispensed into each of the extraction unit 104, the feeding unit 112, the filtration unit 114 and the buffer unit 116. The alkaline solution removes any fats and/or oil, or bio films accumulated over a period of time into the various components. Subsequently, the components are rinsed with clean water from the RO unit 120. The clean water removes the traces of the alkaline solution from the components of the system 100.

Furthermore, each of the extraction unit 104, the feeding unit 112, the filtration unit 114 and the aseptic buffer unit 116 is sanitized by selectively dispensing acid solutions to the components of the system 100. It may be well appreciated that the alkaline solution and the acid solution used for cleaning and sanitizing the various components of the system 100 are FDA approved.

Once the sanitizing of each of the extraction unit 104, the feeding unit 112, the filtration unit 114 and the buffer unit 116 is completed, the components are again rinsed with clean water from the RO unit 120 in order to remove all the traces of the acid solution from the components of the system 100.

Subsequently, the components are dried and decontaminated by using hot air and VHP vapours respectively, in a similar manner as explained previously for the cleaning cycle.

A VHP areation cycle is performed after the VHP decontamination cycle to prevent any hydrogen peroxide residues to remain inside the system and contaminating the low acid liquid. VHP vapours are vented out by a flow of ambient temperature sterile air flow provided by the drying unit The system 100 and the method 300 performed by the system 100 for packaging low acid juice or liquid provides aseptic and sterile packaging of such liquids and juices. The aseptic and sterile packaging of low acid juices and liquids facilitates increased shelf lives of such packaged juices without altering their flavor profile, nutrient content, chemical, physical or organoleptic properties.

The CIP unit 118 continuously cleans the entire system 100, the components such as the extraction unit 104, the feeding unit 112, the filtration unit 114 and the aseptic buffer unit 116 along with the fluidic connections, thereby increasing the efficiency and reliability of the system 100. The CIP unit 118 eliminates the need for dismantling the system 100 for cleaning purposes. Additionally, the system 100 provides a high grade packaged coconut water, as at all the stages, the aseptic conditions are maintained. The system 100 and the method 300 replaces the conventional heat and UHT treatment for packaging the coconut water (or any other low acid liquid or juice) with a novel technique of extracting, filtering and filling the coconut water into commercial containers for packaging.

Additionally, the system 100 uses FDA approved chemicals to clean the components of the system 100 thereby eliminating any type of contamination. The nitrogen padding on the feeding unit 112 and the aseptic buffer unit 116 prevents any air and impurities from entering into the system 100. Additionally, the speed of cleaning of the system 100 is faster due to the presence of the CIP unit 118, thereby reducing the need for cooling the coconut water before filtration. Also, the size of the feeding unit 112 and the aseptic buffer unit 116 may also be reduced optimally as the filling and the cleaning processes are continuous, thereby reducing the need for larger feeding and buffer units.

Furthermore, the high frequency flow reversal method of cleaning the filtration unit 114 and the micro sieve membrane 218 ensures complete removal of the layer of impurities and the impurities clogged in the pores without damaging the micro sieve membrane 218. For example, the HFFR technique minimizes vibrations and uses less pressure vacuum on the membrane 218, thereby minimizing the damaging effect on the membrane 218. This increases the life and reliability of the filtration unit 114 and hence the system 100. Also it significantly increases the filtration capacity of the system 100 thereby resulting in pure coconut water being packaged in the commercial containers, meeting and exceeding the FDA standards.

The foregoing discussion of the present invention has been presented for purposes of illustration and description. It is not intended to limit the present invention to the form or forms disclosed herein. In the foregoing Detailed Description, for example, various features of the present invention are grouped together in one or more embodiments, configurations, or aspects for the purpose of streamlining the disclosure. The features of the embodiments, configurations, or aspects may be combined in alternate embodiments, configurations, or aspects other than those discussed above. This method of disclosure is not to be interpreted as reflecting an intention the present invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate embodiment of the present invention.

Moreover, though the description of the present invention has included description of one or more embodiments, configurations, or aspects and certain variations and modifications, other variations, combinations, and modifications are within the scope of the present invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system for packaging low acid liquids, the system comprising:
    an extraction unit configured to extract the low acid liquid;
    a feeding unit configured to receive the low acid liquid from the extraction unit and feed the low acid liquid to a filtration unit;
    the filtration unit fluidly connected to the feeding unit and configured to receive the low acid liquid, the filtration unit including at least one membrane having a plurality of pores configured to filter the low acid liquid to achieve sterile low acid liquid;
    an aseptic buffer unit fluidly connected to the filtration unit and configured to receive the filtered low acid liquid and aseptically dispense the filtered low acid liquid to a container for packaging; and
    an automatic cleaning in place unit operatively coupled to the extraction unit, the feeding unit, the filtration unit and the aseptic buffer unit, wherein the automatic cleaning in place unit is configured to automatically sterilize at least the filtration unit using at least a decontamination material,
    wherein each of the feeding unit and the aseptic buffer unit is fluidly connected to one or more liquid nitrogen injectors configured to provide a nitrogen blanket therein.

2. The system of claim 1, wherein the automatic cleaning in place unit is further configured to automatically sterilize each of the extraction unit, the feeding unit and the aseptic buffer unit by using at least the decontamination material.

3. The system of claim 1, wherein the automatic cleaning in place unit comprises:
    a hot water dispensing unit configured to selectively dispense hot water for rinsing at least one of the extraction unit, the feeding unit, the filtration unit and the aseptic buffer unit, the hot water being purified by a reverse osmosis unit;
    a drying unit configured to dry the hot water from at least one of the extraction unit, the feeding unit, the filtration unit and the aseptic buffer unit; and
    a decontamination unit configured to selectively dispense the decontamination material capable of decontaminating at least one of the extraction unit, the feeding unit, the filtration unit and the aseptic buffer unit.

4. The system of claim 3, wherein the drying unit further comprises one or more air filters configured to filter air provided for drying the at least one of the extraction unit, the feeding unit, the filtration unit and the aseptic buffer unit.

5. The system of claim 1, wherein the automatic cleaning in place unit further comprises:
    an alkaline dispensing unit configured to selectively dispense an alkaline solution into the at least one of the extraction unit, the feeding unit, the filtration unit and the aseptic buffer unit; and
    an acid dispensing unit configured to selectively dispense acidic solution into the at least one of the extraction unit, the feeding unit, the filtration unit and the aseptic buffer unit.

6. The system of claim 1, wherein the decontamination material is Hydrogen Peroxide Vapor (VHP).

7. The system of claim 1 wherein the extraction unit is fluidly connected by fluid connection to the feeding unit via a pre-filter.

8. A system for packaging low acid liquids, the system comprising:
    an extraction unit configured to extract the low acid liquid;
    a feeding unit configured to receive the low acid liquid from the extraction unit and feed the low acid liquid to a filtration unit;
    the filtration unit fluidly connected to the feeding unit and configured to receive the low acid liquid, the filtration unit including at least one membrane having a plurality of pores configured to filter the low acid liquid to achieve sterile low acid liquid;
    an aseptic buffer unit fluidly connected to the filtration unit and configured to receive the filtered low acid liquid and aseptically dispense the filtered low acid liquid to a container for packaging; and
    an automatic cleaning in place unit operatively coupled to the extraction unit, the feeding unit, the filtration unit and the aseptic buffer unit, wherein the automatic cleaning in place unit is configured to automatically sterilize at least the filtration unit using at least a decontamination material,
    wherein the filtration unit further comprises:
    a membrane rotatably supported on one or more support discs, the membrane having a feed side and a filtrate side;
    one or more suction bars having a plurality of suction slits; and
    a hollow rotary shaft configured to rotatably support the membrane and the one or more suction bars, the hollow rotary shaft being configured to selectively allow passage of filtered low acid liquid there through and facilitate automatic cleaning of the filtration unit, and wherein the membrane is configured to rotate to bring any point on the membrane in close proximity to the suction slits and suck the layer of impurities on the feed side into a suction pipe.

9. The system of claim 8, wherein each of the feeding unit and the aseptic buffer unit is fluidly connected to a one or more liquid nitrogen injectors configured to provide a nitrogen blanket therein.

10. The system of claim 8, wherein the membrane is a single-layered high flux micro sieve membrane.

11. The system of claim 8, wherein the automatic cleaning in place unit is further configured to automatically sterilize each of the extraction unit, the feeding unit and the aseptic buffer unit by using at least the decontamination material.

12. The system of claim 8, wherein the automatic cleaning in place unit comprises:
a hot water dispensing unit configured to selectively dispense hot water for rinsing at least one of the extraction unit, the feeding unit, the filtration unit and the aseptic buffer unit, the hot water being purified by a reverse osmosis unit;
a drying unit configured to dry the hot water from at least one of the extraction unit, the feeding unit, the filtration unit and the aseptic buffer unit; and
a decontamination unit configured to selectively dispense the decontamination material capable of decontaminating at least one of the extraction unit, the feeding unit, the filtration unit and the aseptic buffer unit.

13. The system of claim 12, wherein the drying unit further comprises one or more air filters configured to filter air provided for drying the at least one of the extraction unit, the feeding unit, the filtration unit and the aseptic buffer unit.

14. The system of claim 8, wherein the automatic cleaning in place unit further comprises:
an alkaline dispensing unit configured to selectively dispense an alkaline solution into the at least one of the extraction unit, the feeding unit, the filtration unit and the aseptic buffer unit; and
an acid dispensing unit configured to selectively dispense acidic solution into the at least one of the extraction unit, the feeding unit, the filtration unit and the aseptic buffer unit.

15. The system of claim 8, wherein the decontamination material is Hydrogen Peroxide Vapor (VHP).

16. The system of claim 8 wherein the extraction unit is fluidly connected by fluid connection to the feeding unit via a pre-filter.

* * * * *